United States Patent
Reidt

(10) Patent No.: US 9,164,934 B2
(45) Date of Patent: Oct. 20, 2015

(54) SYSTEM AND METHOD FOR CONTROLLING BUS-NETWORKED DEVICES VIA AN OPEN FIELD BUS

(71) Applicant: Eaton Electrical IP GmbH & Co. KG, Schoenefeld (DE)

(72) Inventor: Georg Reidt, Swisttal (DE)

(73) Assignee: EATON ELECTRICAL IP GMBH & CO. KG, Schoenefeld (DE)

( * ) Notice: Subject to any disclaimer, the term of this patent is extended or adjusted under 35 U.S.C. 154(b) by 0 days.

(21) Appl. No.: 14/555,607

(22) Filed: Nov. 27, 2014

(65) Prior Publication Data

US 2015/0149670 A1    May 28, 2015

Related U.S. Application Data

(63) Continuation of application No. 12/665,438, filed as application No. PCT/EP2007/006017 on Jul. 6, 2007, now Pat. No. 8,935,435.

(51) Int. Cl.
*G06F 13/00* (2006.01)
*G06F 13/20* (2006.01)
*H04L 12/40* (2006.01)
(Continued)

(52) U.S. Cl.
CPC ............... *G06F 13/20* (2013.01); *G06F 1/266* (2013.01); *H04L 12/40013* (2013.01); *H04L 43/0817* (2013.01); *H04L 2012/4026* (2013.01); *H04L 2012/40234* (2013.01)

(58) Field of Classification Search
None
See application file for complete search history.

(56) References Cited

U.S. PATENT DOCUMENTS

| 4,763,320 A | 8/1988 | Rudolph et al. |
| 5,422,808 A | 6/1995 | Catanese, Jr. et al. |

(Continued)

FOREIGN PATENT DOCUMENTS

| CN | 1780247 A | 5/2006 |
| DE | 3424866 A1 | 1/1986 |

(Continued)

OTHER PUBLICATIONS

Barheine: "Der LIN-Bus im Uberblick", Internet Citation, (Online) Sep. 28, 2005, XP002448123; retrieved from the Internet: URL: http://www.barheine.de/LIN-Bus.pdf; the whole document on Jun. 17, 2010.

(Continued)

*Primary Examiner* — Elias Mamo
(74) *Attorney, Agent, or Firm* — Leydig, Voit & Mayer, Ltd.

(57) ABSTRACT

A system for controlling bus-networked devices includes a gateway including a memory unit and having an interface to an open field bus. A power supply unit supplies primary power for the gateway and bus subscribers. An auxiliary power supply unit supplies auxiliary power for the bus subscribers independent of bus functionality. A pluggable connection cable is electrically connects the gateway to the bus subscribers and transmits the primary and the auxiliary power and control and/or status information between the gateway and the bus subscribers. An application bus networks the bus subscribers to each other and is operable by the connection cable. A bus controller writes a target bus configuration of the application bus and stores the target bus configuration in a non-volatile manner in the memory unit. The bus controller is also configured to overwrite the target bus configuration with a present, actual bus configuration.

11 Claims, 6 Drawing Sheets

(51) Int. Cl.
*G06F 1/26* (2006.01)
*H04L 12/26* (2006.01)

(56) References Cited

U.S. PATENT DOCUMENTS

| | | | |
|---|---|---|---|
| 5,978,593 | A | 11/1999 | Sexton |
| 6,095,867 | A | 8/2000 | Brandt et al. |
| 6,256,544 | B1 | 7/2001 | Weissinger |
| 6,430,218 | B1 | 8/2002 | Mito |
| 6,522,515 | B1 | 2/2003 | Whitney |
| 6,640,140 | B1 | 10/2003 | Lindner et al. |
| 6,838,999 | B1 | 1/2005 | Roepke |
| 6,881,903 | B2 | 4/2005 | Greiner et al. |
| 6,970,772 | B2 | 11/2005 | Radtke et al. |
| 7,046,166 | B2 | 5/2006 | Pedyash et al. |
| 7,072,407 | B2 | 7/2006 | Schurig |
| 7,075,414 | B2 | 7/2006 | Giannini et al. |
| 7,093,050 | B2 | 8/2006 | Niklasson |
| 7,263,635 | B2 | 8/2007 | Hentsch |
| 7,269,675 | B2 | 9/2007 | Dalakuras et al. |
| 7,327,222 | B2 | 2/2008 | Peltonen et al. |
| 7,328,286 | B2 | 2/2008 | Vinnemann |
| 7,433,949 | B2 | 10/2008 | Xu et al. |
| 7,602,617 | B2 | 10/2009 | Brandt et al. |
| 7,715,176 | B2 | 5/2010 | Perez et al. |
| 7,741,958 | B2 * | 6/2010 | Brandt et al. ............... 375/257 |
| 7,804,427 | B1 | 9/2010 | Diamond et al. |
| 7,923,855 | B2 | 4/2011 | Biegert |
| 7,945,340 | B2 | 5/2011 | Ueno et al. |
| 8,004,112 | B2 | 8/2011 | Koga et al. |
| 8,149,587 | B2 | 4/2012 | Baran et al. |
| 2002/0042857 | A1 | 4/2002 | Jones et al. |
| 2003/0099229 | A1 | 5/2003 | Tretter et al. |
| 2003/0126222 | A1 | 7/2003 | Peterson et al. |
| 2003/0158983 | A1 * | 8/2003 | Dalakuras et al. ............ 710/107 |
| 2004/0059844 | A1 | 3/2004 | Jones et al. |
| 2004/0078714 | A1 | 4/2004 | Hentsch |
| 2004/0160990 | A1 | 8/2004 | Logvinov et al. |
| 2005/0201306 | A1 * | 9/2005 | Engel ........................... 370/299 |
| 2006/0058847 | A1 * | 3/2006 | Lenz et al. ....................... 607/5 |
| 2006/0067209 | A1 | 3/2006 | Sheehan et al. |
| 2006/0077917 | A1 | 4/2006 | Brahmajosyula et al. |
| 2006/0259204 | A1 | 11/2006 | Jordan et al. |
| 2006/0282182 | A1 | 12/2006 | Da Silva Neto |
| 2007/0195823 | A1 * | 8/2007 | Biegert ........................ 370/485 |
| 2007/0198748 | A1 | 8/2007 | Ametsitsi et al. |
| 2008/0177919 | A1 | 7/2008 | Miyazawa et al. |
| 2011/0119507 | A1 | 5/2011 | Reidt |
| 2011/0260556 | A1 | 10/2011 | Partridge et al. |
| 2014/0293849 | A1 * | 10/2014 | Odio Vivi .................... 370/311 |

FOREIGN PATENT DOCUMENTS

| | | |
|---|---|---|
| DE | 3915456 A1 | 11/1990 |
| DE | 68920028 T2 | 7/1995 |
| DE | 19606747 A1 | 8/1997 |
| DE | 19756918 A1 | 1/1999 |
| DE | 19931999 A1 | 1/2001 |
| DE | 19935192 A1 | 2/2001 |
| DE | 10147442 A1 | 4/2003 |
| DE | 10147446 A1 | 4/2003 |
| DE | 10358231 A1 | 7/2005 |
| DE | 102005024559 A1 | 11/2006 |
| EP | 0393293 A1 | 10/1990 |
| EP | 0637784 A1 | 2/1995 |
| EP | 0779640 A2 | 6/1997 |
| EP | 0788043 A2 | 8/1997 |
| EP | 1315355 A2 | 5/2003 |
| EP | 1618943 A1 | 1/2006 |
| GB | 2372872 A | 9/2002 |
| JP | 2000267982 A | 9/2000 |
| JP | 200277214 A | 3/2002 |
| JP | 2003218904 A | 7/2003 |
| JP | 200488208 A | 3/2004 |
| JP | 2005269890 A | 9/2005 |
| JP | 2006511172 A | 3/2006 |
| JP | 2007174418 A | 7/2007 |
| JP | 2008541614 A | 11/2008 |
| JP | 2011122701 A | 6/2011 |
| PL | 159060 B1 | 11/1992 |
| PL | 295090 A2 | 4/1993 |
| PL | 180146 B1 | 12/2000 |
| RU | 2037190 C1 | 6/1995 |
| RU | 2214000 C2 | 10/2003 |
| RU | 43709 U1 | 1/2005 |
| RU | 2332803 C2 | 8/2008 |
| SU | 1732366 A1 | 5/1992 |
| WO | WO 2004028083 A1 | 4/2004 |
| WO | WO 2005001699 A2 | 1/2005 |

OTHER PUBLICATIONS

Schmidt T: "Enhancing automotive subsystem design with LIN," Circuit Cellar Ink, circuit Cellar Inc., Vernon, CT, US, No. 127, Feb. 2001, pp. 60-62, 65, XP008004109; ISSN: 0896-8985, p. 1, col. 3, line 21-p. 2, col. 3, line 5, figures 1,3.
International Search Report dated Jun. 25, 2008 from PCT/EP2007/006017, published as WO2009/006916A1.
Rolf Becker, "Intelligenz im Netz: Der InfoGuide für Einsteiger und Anwender", AS—Interface: Das Aktuator-Sensor-Interface für die Automation, Dec. 2000, pp. 6-29.
Sirius Motormanagement, Systemhandbuch Ausgabe Oct. 2005, Sections 1.1-1.7, 1.17-1.12, 6.9, 6.10, 6.14, 6.15, 7.14, 13.25-13.30, 14.2-14.5 Oct. 2005, SIMCODEPRO.
Martin Schefter, "Connecting instead of Wiring", Open Automation, Ausgabe May 2006, Oct. 9, 2006, pp. 2, 4-7.
Marxen, et al., "The Evolution of Automation at Moeller Enters a New Era", Automation Solutions in Machine and System Building Solutions 14, Nov. 2006, pp. 2-11.
U.S. Appl. No. 14/819,458, filed Aug. 6, 2015.
U.S. Appl. No. 14/665,438, filed Jul. 9, 2010.
MN03402001Z-DE, "Verbindungssysteme SmartWire Module", Jul. 2009.
MN03407001Z-DE, "Verbindungssystem SmartWire SWIRE-GW-DP", Nov. 2006.

* cited by examiner

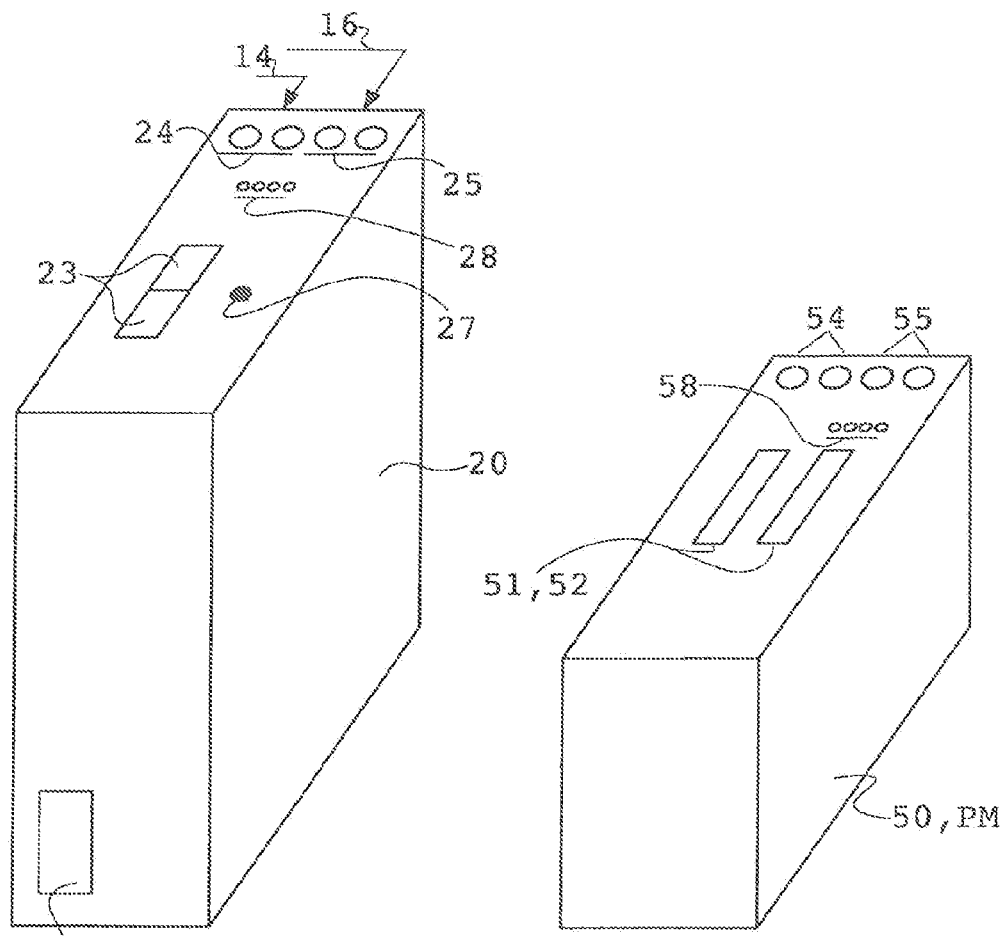
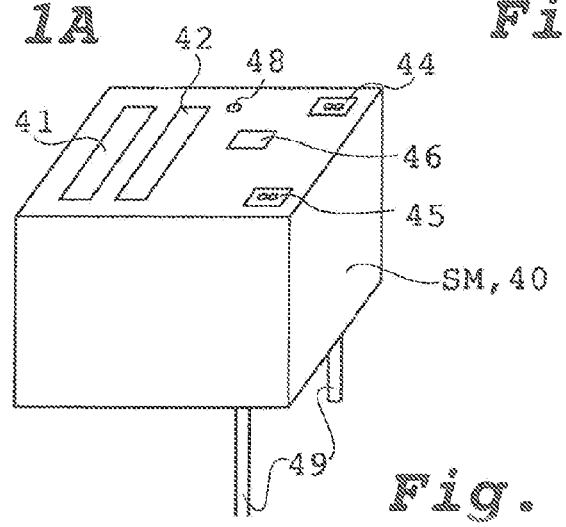

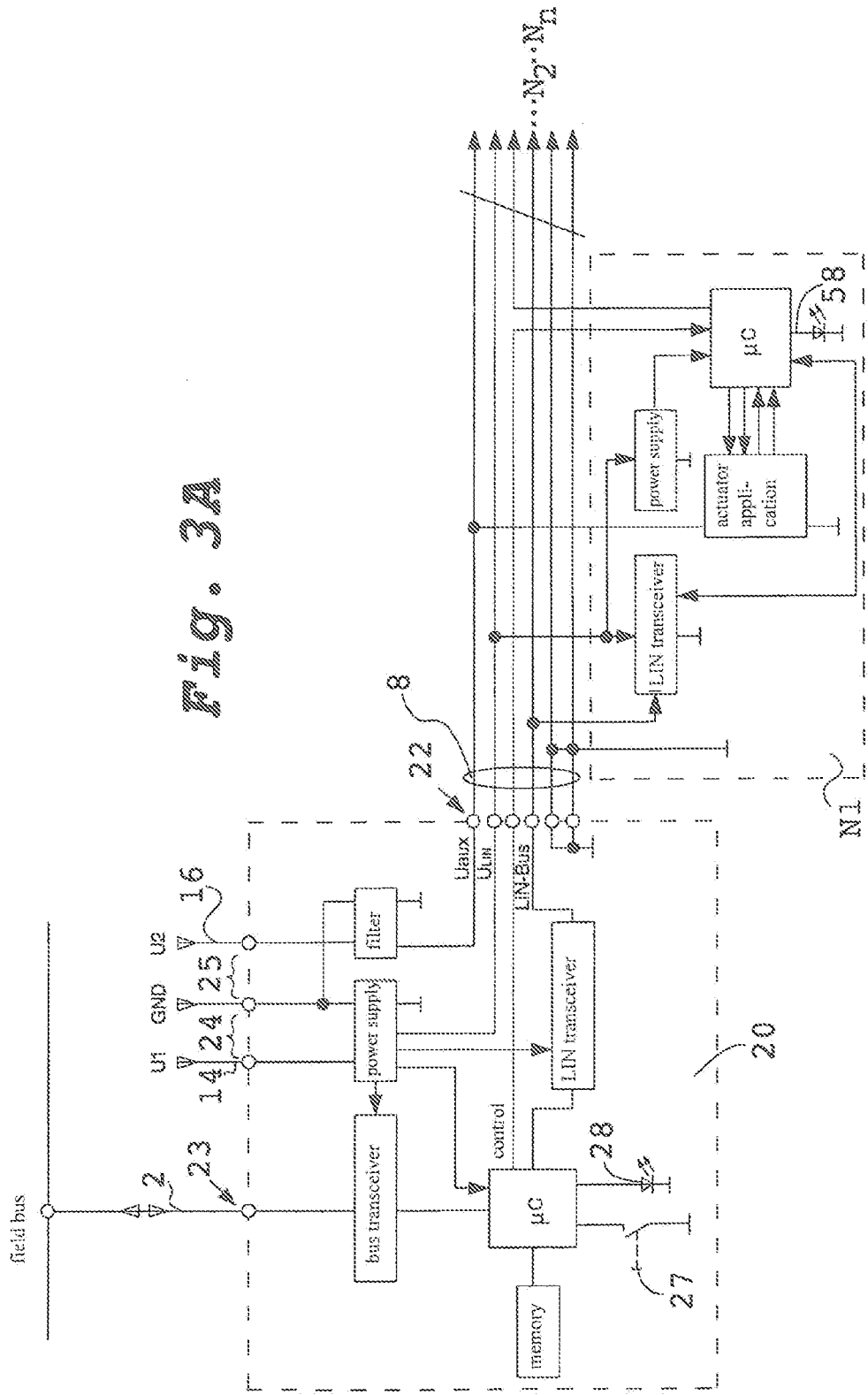

SYSTEM AND METHOD FOR CONTROLLING BUS-NETWORKED DEVICES VIA AN OPEN FIELD BUS

CROSS REFERENCE TO RELATED APPLICATIONS

This application is a continuation of U.S. application Ser. No. 12/665,438, filed Jul. 9, 2010, which is a U.S. National Phase application under 35 U.S.C. §371 of International Application No. PCT/EP2007/006017, filed Jul. 6, 2007. The International Application was published in German on Jan. 15, 2009 as WO 2009/006916 A1 under PCT Article 21 (2).

FIELD

The present invention relates to a system and a method for controlling bus-networked devices with a gateway via an open field bus.

The subject matter comprises, in particular, the data-technical networking, the subscriber configuration of the devices and the electric supply of the devices with power. Typical devices are industrial switching devices such as contactors, motor starters, power switches and measuring sensors as well as similar devices.

BACKGROUND

In electric installations, the above-mentioned industrial switching devices and others are normally operated or monitored centrally by means of a control system, for instance, by means of a programmable logic controller (PLC). Typically, the switching devices are connected to the control unit (e.g. the PLC) via the control wiring lines. As a rule, this control unit comprises the lines that can turn the switching device, here preferably a contactor, on and off, and that, at the same time, provide the requisite power for operating the switching device and it comprises lines that return the signals from the switching device to the control unit for monitoring purposes. Examples of signals for monitoring a switching device, here especially a motor starter, are the status of the contactor switching position (ON/OFF) or the status of the motor circuit breaker (ON/tripped).

When an electric installation (for instance, a switch cabinet) is being set up, the wiring and interconnection of the electric switching devices with the control system are usually done manually, typically by electricians. This work can often be a very time-consuming part of the set-up of the switch cabinet. Moreover, the wiring via many similar control lines is error-prone since, for example, they can be inadvertently mixed up when they are laid in the cable conduits, as a result of which they might be connected to terminals of the wrong devices. Furthermore, the control lines have to be laid to the individual switching devices in order to be electrically connected there. This calls for additional work to the effect that cable conduits for laying the lines have to be specifically cut to length and mounted on the assembly plate, and the individual control lines can then be laid in these cable conduits.

The devices may be interconnected between a bus and other components of a system. European patent application EP 0 779 640 A2 describes, for instance, the use of bus-compatible amplifier modules for drive assemblies of electric switching devices. The electromagnetic or electronic amplifier assembly is connected via an interface circuit to bus connectors and, on the one hand, to feed current connectors and, on the other hand, to drive connectors. The interface circuit is configured to be bidirectional or unidirectional. Moreover, switching means are provided for signals that are to be taken over from the bus for setting parameters of the amplifier module and/or of the switching device as well as switching means for picking up signals that are to be transmitted to the bus about the states of the amplifier module and/or of the switching device.

Regarding coupling to a bus, European patent application EP 0 637 784 A1 describes a module that is provided with a bus coupler which, on the one hand, is connected to a contact system for the electric and mechanical connection to the bus and, on the other hand, to an electronic evaluation unit for the programmed processing of measured signals or state information as well as for issuing switch-off commands, whereby the measured signals or state information are fed via the bus. The module itself can construct switch-off commands by processing the measured signals and then relaying them to the tripping system for a circuit breaker.

German patent application DE 101 47 442 A1 describes a method and a device as well as a control unit for monitoring a bus system having at least three subscribers, whereby one subscriber is configured as the superordinated subscriber and it initiates every data transmission to the bus system. A second subscriber is configured as an element of a locking system of a lockable interior of a vehicle, while a third subscriber is configured so as to be outside of the lockable interior of a vehicle. The first subscriber monitors the data transmission in such a way that, in at least one operating state of the vehicle and/or the bus system, the first subscriber initiates measures to prevent the transmission of data in the case of every data transmission to the bus system that was not initiated by said subscriber itself. A LIN bus system is employed as the bus system.

German patent application DE 101 47 446 A1 also describes a method and a device for monitoring a bus system having at least two subscribers, of which at least one is configured as an authorized subscriber, and it monitors the data transmission to the bus system, whereby, an identifier is transmitted with every data transmission to the bus system, and this identifier can be unambiguously associated with a subscriber. If the data transmission is initiated by an entity other than an authorized subscriber, the execution of the data to be transmitted is prevented. A LIN bus system is employed here as well.

German patent application DE 197 56 918 A1 describes a communication control device in which a master station transmits a batch transmission frame to a plurality of slave stations, and individual response frames are transmitted from the slave stations to the master station.

DE 689 20 028 T2 describes a method and a device that allows multiple access with cyclical reservation in a communication system, whereby access is provided to the transmission medium in the communication network with a unidirectional bus structure in a folded-bus configuration or in a double-bus configuration and a plurality of stations that are connected between the buses. The network comprises two unidirectional, opposite transmission buses and a plurality of stations, each of which is connected to the two buses. There is also a head end that generates times slots at regular intervals on the buses, whereby each station requests access to a slot.

German patent application DE 34 24 866 A1 describes a method and an arrangement for the transmission of data, whereby the latter is transmitted in a time-division multiplex in digital form in a bus system. The bus system consists of a central control unit, several equivalent subscribing stations subordinated to the control unit, and at least one data bus line that connects all of the subscribers.

SUMMARY

An embodiment of the present invention provides a system for controlling bus-networked devices. The system includes a gateway including at least one memory unit and having an interface to an open field bus. A first power supply unit is electrically connected to the gateway and configured to supply primary power for the gateway and a plurality of bus subscribers. An auxiliary power supply unit is configured to supply auxiliary power for the plurality of bus subscribers independent of bus functionality. A pluggable connection cable is configured to electrically connect the gateway to the plurality of bus subscribers and to transmit the primary and the auxiliary power and at least one of control information and status information between the gateway and the plurality of bus subscribers. An application bus is configured to network the plurality of bus subscribers to each other and is operable by the connection cable. A bus controller is configured to write a target bus configuration of the application bus and to store the target bus configuration in a non-volatile manner in the at least one memory unit. The bus controller is also configured to overwrite the target bus configuration with a present, actual bus configuration of the application bus as a new target configuration.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 1A to 1C respectively illustrate three typical hardware components of a system by way of example;

FIGS. 3A and 3B are block diagrams of the application bus system;

DETAILED DESCRIPTION

Figure 2A:
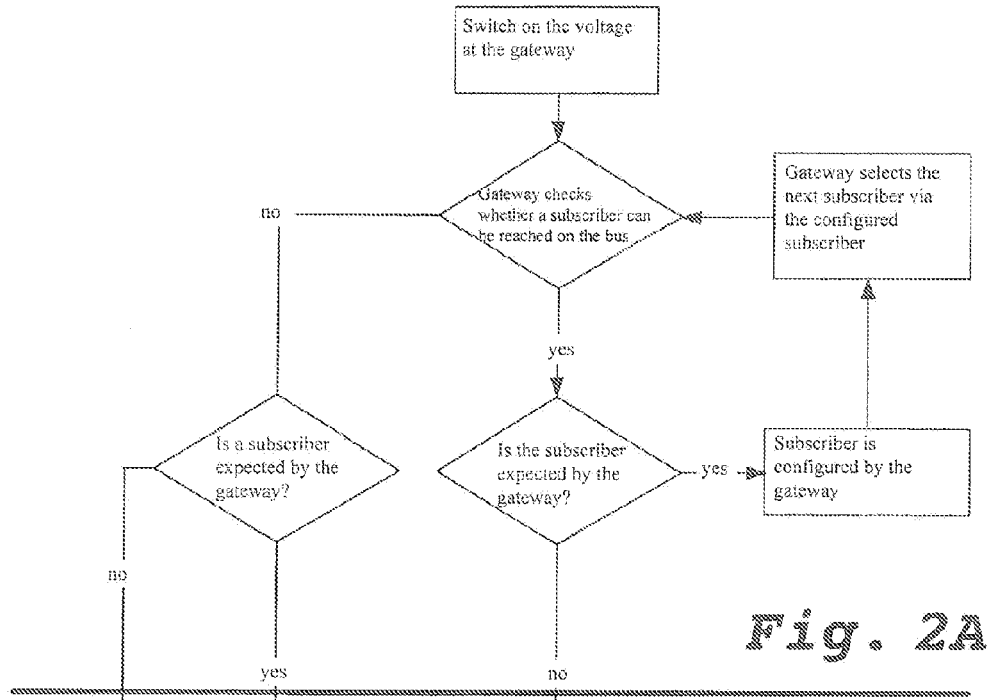
FIGS. 2A and 2B are portions of a flowchart which depict the system test and the taking over of a new target configuration of the connected devices on the application bus.

In an embodiment, the present invention provides a simplified system and method for controlling bus-networked devices with a gateway via an open field bus in such a way that there is no need for complicated wiring and the user can check, configure and, in case of error messages, re-start the system with minimal operating effort.

The system according to an embodiment of the invention provides for one single pluggable connection line within the system for connecting bus subscribers and the gateway, and for transmitting control and/or status data as well as power. In the method according to an embodiment of the invention, the gateway does not expect a bus subscriber in the initial target configuration, and a configuration mode is started in the gateway for purposes of taking over at least one bus subscriber and for generating a new target configuration with the at least one bus subscriber. The switching device according to an embodiment of the invention has at least one control input for querying an upstream switching device as a bus subscriber and/or for querying a gateway (20), and said switching device also has a control output for selecting a downstream switching device as another bus subscriber.

Therefore, an embodiment of the invention relates to a system with which actuators as bus subscribers, preferably industrial switching devices such as, for example, power switches or combinations of motor circuit breakers and contactors, are data-technically networked via an application bus system, here preferably via a LIN bus, with the aim of controlling and monitoring the connected industrial switching devices. The system has at least one gateway that is installed between an open field bus and actuators. The single pluggable connection line connects the individual bus subscribers or actuators among each other and to the gateway. It serves to transmit data, namely, control and/or status data, and to transmit power to supply the bus subscribers and, if applicable, other components of the system. Advantageously, the gateway is arranged between the open field bus and the connection line, and it has connection devices for connecting with the field bus as well as for connecting the mains voltage and the connection line. Numerous functions that will be elaborated upon below can be carried out via the gateway.

Special advantages of the system and method according to an embodiment of the invention are that the control wiring to the industrial switching devices is replaced by a pluggable and easily installed line connection system. Complicated and error-prone installations of the control wiring are eliminated and the use of cable conduits needed for laying the lines as well as the installation of the conduits are dispensed with.

Such wiring comprises the control lines, here preferably for a contactor, the line for switching the contactor on and off, and the status lines, here, for instance, for querying the switching position of the contactor or the status of a motor circuit breaker (ON/tripped).

Naturally, it is also possible to connect complex devices as actuators or bus subscribers that can exchange a great deal of information and data. Such devices can be, for example, industrial switching devices such as power switches, electronic motor-protection relays or frequency converters.

The system for controlling bus-networked devices with a gateway via an open field bus can have the following features, either individually or in combination with each other. In particular, a bus controller is provided here for monitoring the gateway. The gateway itself advantageously has at least one interface to the open field bus, at least one interface to an application bus for controlling and querying at least one actuator or bus subscriber located on the application bus and at least one data output for the communication with at least one bus subscriber. It has also proven to be advantageous for the gateway to have at least one memory unit for storing, in a non-volatile manner, a bus configuration that can be written by a bus controller and for storing the present bus configuration of the application bus.

Moreover, it has proven to be advantageous for the gateway to comprise at least a first feed bushing to provide primary supply voltage and at least a second feed bushing to provide auxiliary voltage that can be conducted or that is conducted to the bus subscribers. The gateway can also be connectable or connected to at least one control line to address the first bus subscriber.

It has also proven to be advantageous for the gateway to have at least one status display to show the operating states of bus subscribers and of the bus communication, and/or the at least one bus subscriber has at least one display to show its own operating status. As a result, it is possible to visually check the proper operation of the system at all times.

Furthermore, the gateway advantageously has at least one actuation element for starting a bus configuration of the bus subscribers connected via the application bus. In this configuration, in other words, in the configuration mode, the gateway checks via an application bus how many bus subscribers are connected to the application bus, whereby the bus subscribers are advantageously numbered consecutively. In this context, each bus subscriber can store its specific identification number, and/or the gateway can store the identification numbers in a non-volatile manner. As a result, no data loss occurs, even if the system is switched on again after it has been switched off, so that the operation can resume without a need for additional measures after being switched on. Advantageously, once all of the bus subscribers have been ascertained, this configuration can be stored or is stored in the gateway (20) as the target configuration, and control data and/or status data can be exchanged or is exchanged between the gateway and the bus subscribers.

As far as the at least one bus subscriber or actuator is concerned, it has proven to be advantageous for it to have at least one control input for querying an upstream bus subscriber and/or the gateway, and it has a control output for selecting a downstream bus subscriber. Moreover, it can encompass at least one control and programming unit for implementing the bus communication and the functionality of the actuator application.

For the current supply or the supply with power, the at least one bus subscriber can have a device for connection to the mains voltage. Moreover, it advantageously has at least one device to loop through the data stream and/or the auxiliary voltage to a downstream bus subscriber or actuator and/or to relay the auxiliary voltage to an actuator application.

Advantageously, the at least one bus subscriber has at least one device to carry out actuator actions and/or at least one device to report actuator actions and/or actuator positions on the application bus, so that communication about the actuator positions and actuator actions is possible via the application bus.

The at least one bus subscriber advantageously also has at least one device to write an identification number via the gateway. This makes it possible to check the number of bus subscribers connected to the application bus. In this context, the bus subscribers are advantageously numbered consecutively. Each individual bus subscriber stores the specific identification number in a non-volatile manner, that is to say, the specific identification number is once again available when the system is switched back on after having been switched off and is not lost because the system was switched off. All of the identification numbers are advantageously likewise stored in the gateway in a non-volatile manner.

The application bus can be a LIN bus with which the control and/or status data and the handling of the configuration of the application bus can be handled or is handled via a protocol which, in particular, consists of LIN data frames with data lengths of 1 to 8 bytes. Fundamentally, a different structure with, for example, other data lengths is also possible.

A possible application bus configuration can be written in the gateway and stored therein in a non-volatile manner. It is likewise possible for the bus controller to overwrite an application bus configuration that has been written.

As far as the bus subscribers or actuators are concerned, according to an embodiment of the invention, it is assumed that at least one actuator can be an electric switching device. In this context, an actuator can especially be a combination of motor circuit breakers and contactors.

Advantageously, a plug-in module is provided that can have, on the one hand, the actuator properties and, on the one hand, at least one mechanical display to show actuator positions and/or at least one display for its own operating status. As a result, the actuator positions that can be added to the actuators, in other words, especially switching devices, can be displayed by the plug-in module. Instead of having to retrofit the switching devices, it is sufficient to add to them a plug-in module that can also have appropriate plug-in connectors to connect the connection line.

Moreover, the plug-in module can have at least one digital input for the connection of a potential-free switching contact. This is also suitable, for instance, for an auxiliary switch to query the position of the motor circuit breaker in a combination of motor circuit breakers and contactors.

The plug-in module can advantageously have at least one circuit interruptor for the actuator. Such a circuit interruptor can be employed, for example, to electrically lock a reversing starter.

When a plug-in module is arranged on a combination of motor circuit breakers and contactors, it can advantageously switch the auxiliary voltage to the contactor coil. The above-mentioned other features of such a plug-in module can also be advantageously provided, precisely in the case of such a combination of motor circuit breakers and contactors.

The system can also be configured in such a way that a power module is interconnected in the series of bus subscribers or between them, said power module looping through the data stream to the next bus subscriber and/or not looping through the auxiliary voltage. The interconnection of a power module interrupts the "linear" power supply from one bus subscriber to another. The data connection and the primary voltage between the bus subscriber located upstream from the power module and the bus subscriber located downstream from the power module, however, is looped through. With the interconnected power module, a new feed is implemented for the subsequent bus subscriber. Advantageously, an external voltage source is thus provided that supplies the power module with an auxiliary voltage that is transferred to the next bus subscriber. Moreover, the power module advantageously has at least one display to show the presence of the external auxiliary voltage. As a result, the fact that the auxiliary voltage has been applied to the power module and thus to the at least one subsequent bus subscriber can be checked.

Advantageously, at least one bus subscriber or actuator has a mechanical display to show actuator positions so that these can also be read off without current and problem-free.

At least one sensor can be arranged in the series of bus subscribers for purposes of detecting physical quantities.

In the method for controlling bus-networked devices especially in industrial switching circuits with a gateway via an open field bus according to an embodiment of the invention, a configuration mode advantageously runs once the actuation element has been actuated.

The figures show the presented system and the associated method for data-technical networking in the example of combinations of motor circuit breakers and contactors. The subject matter of the application, however, is not to be limited by the depiction of a combination of motor circuit breakers and contactors, that is also referred to as motor starter, and shown by way of an example.

FIG. 1A shows a gateway 20, FIG. 1C shows a bus subscriber in the form of a plug-in module 40 on a combination of motor circuit breakers and contactors, and FIG. 1B shows a power module 50, also referred to as PM, as typical hardware components of a system by way of an example.

The gateway 20 has an interface to a superordinated control system, for instance, to an open field bus 2 (see FIG. 3A) such as a Profibus DP, Device Net or CANopen or the like, by means of which it is networked in data-technical terms to the superordinated field bus system. The bus subscribers N1 to Nn that are networked on an application bus 10 and that are used as industrial switching devices are controlled by the gateway 20 via a flat ribbon cable 8 that is likewise shown in FIG. 3A. The gateway 20 has a first feed device 24 for the connection of a power supply unit 14 for its own electronics and for the electronics of the bus subscribers, as well as a second feed device 25 for the connection of a power supply unit 16 of the bus subscribers. The power supply unit 16 is auxiliary voltage for the actuator actions of the bus subscribers, whereby here, for example, the voltage or current is supplied to the combinations of motor circuit breakers and contactors. The gateway 20 has at least one light-emitting diode 28 that serves to display the status of operating states of the gateway and of the bus communication. The gateway 20 also has a configuration button 27 that serves to start the automatic bus configuration of the bus subscribers; in the gateway 20, there is at least one memory module that is employed to store the bus configuration in a non-volatile manner.

The plug-in module 40 shown in FIG. 1C, which is also referred to as SM, is used for a combination of motor circuit breakers and contactors, said module being mechanically and electrically adapted to the contactor. The plug-in module 40 has two pin contacts 49 that serve to establish the electric connection to a contactor coil. This plug-in module takes over the control wiring. This is how the contactor coil is electrically actuated and the contactor switching position is electrically queried. There is also the possibility to query an electrically potential-free contact insofar as or to the extent that such a contact is present. Aside from the electric functions, the plug-in module 40 also has a switching position display 46 that mechanically—visible to the operator—displays the switching position. The plug-in module 40 also comprises the following features:

- it applies the auxiliary voltage 16 (see FIGS. 3A and 3B) to the contactor coil;
- it displays the mechanical switching position display 46 to show actuator positions;
- it has a display 48 for its own operating status;
- it has a digital input 44 for the connection of a potential-free switching contact; and
- it has a circuit interruptor 45 for the actuator.

Such a circuit interruptor 45 for the actuator can be used, for example, to electrically lock a reversing starter.

Figure 3B:
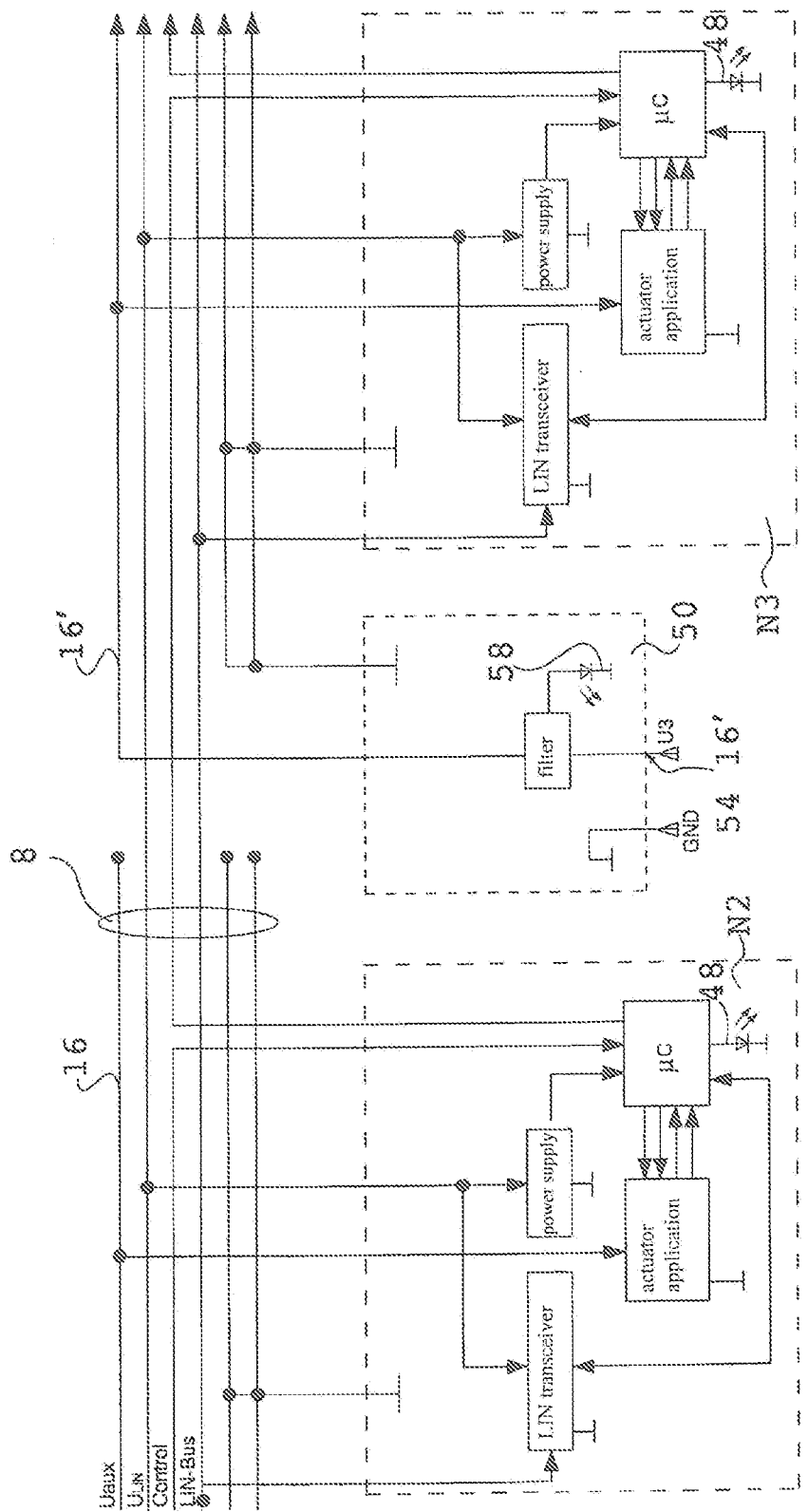

The application bus 10 is operated by means of the above-mentioned multiwire flat ribbon cable 8—six-wire in this case (see FIGS. 3A and 3B). Starting from the gateway 20, the line 8 extends or is laid from one bus subscriber to the next via connection plugs. For each bus subscriber Nx, there are two sockets 41, 42 in the plug-in module 40 that serve to plug in the flat ribbon cable 8 on the bus input side and on the bus output side. Due to the linear arrangement of the subscribers, the last bus subscriber Nn does not have a plugged-in flat ribbon cable 8 on the output side as a connection line; the output side (socket 42) of the bus subscriber remains "empty".

Each bus subscriber has a status display 28, 48, 58 that serves to display the device status, preferably visually as an LED. The plug-in module 40 and the power module 50 of each bus subscriber Nx has a two-pole terminal 44, 45, 54, 55 to which a potential-free contact can be connected, for instance, for an auxiliary switch in order to query the position of the motor circuit breaker.

Figure 5:
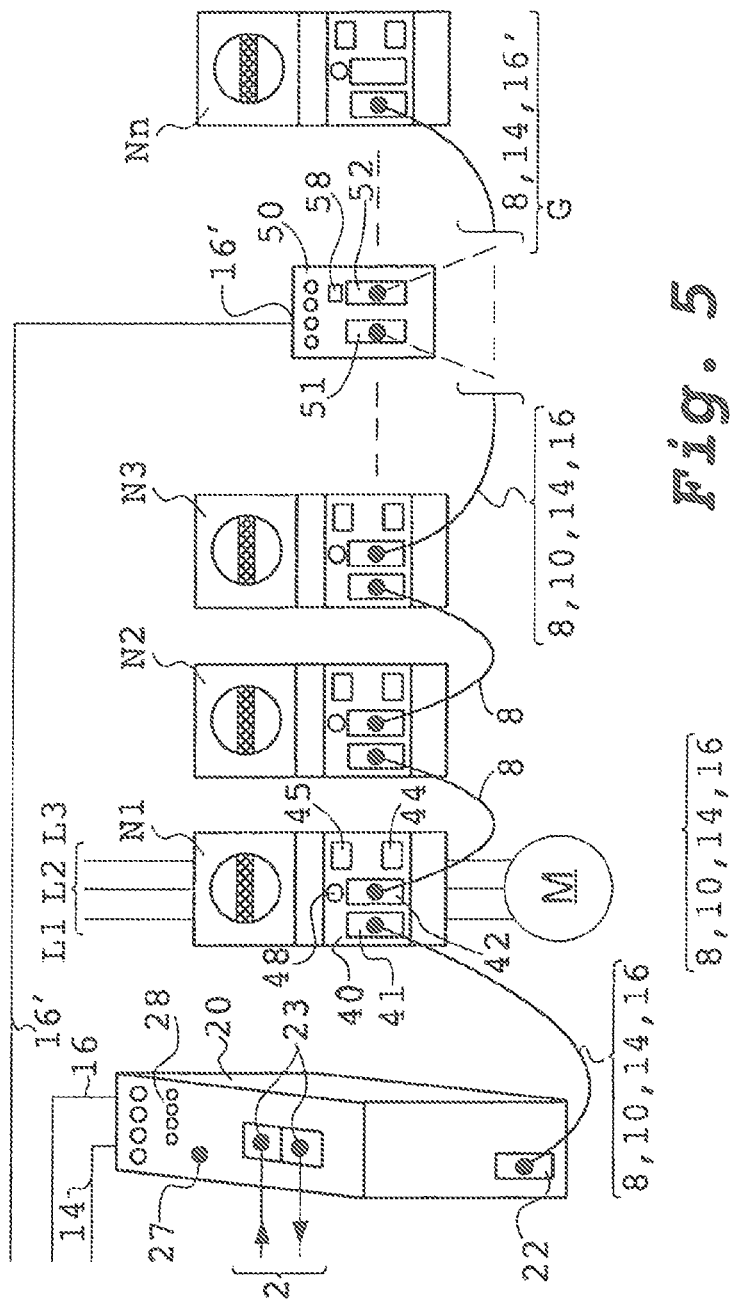
FIG. 5 illustrates a system consisting of a gateway, bus subscribers and a power module.

FIG. 5 shows additional details of the system. Three lines L1, L2, L3 of the mains connection and the load M are shown on the first bus subscriber N1, which is configured here by way of an example as a combination of motor circuit breakers and contactors. Moreover, a motor circuit breaker is shown in the upper half of the bus subscribers designated here as N1, N2, N3 to Nn, while the plug-in module 40 with its sockets 41, 42 and 43 plugged onto a contactor and the mechanical display 48 for the contact position of the contactor are shown in the lower half. The depiction according to FIG. 5 can be understood as an application bus 10 having n subscribers into which the power module 50 shown in FIG. 5 can optionally be inserted. A more detailed explanation of the power module 50 will follow below.

Figure 2B:
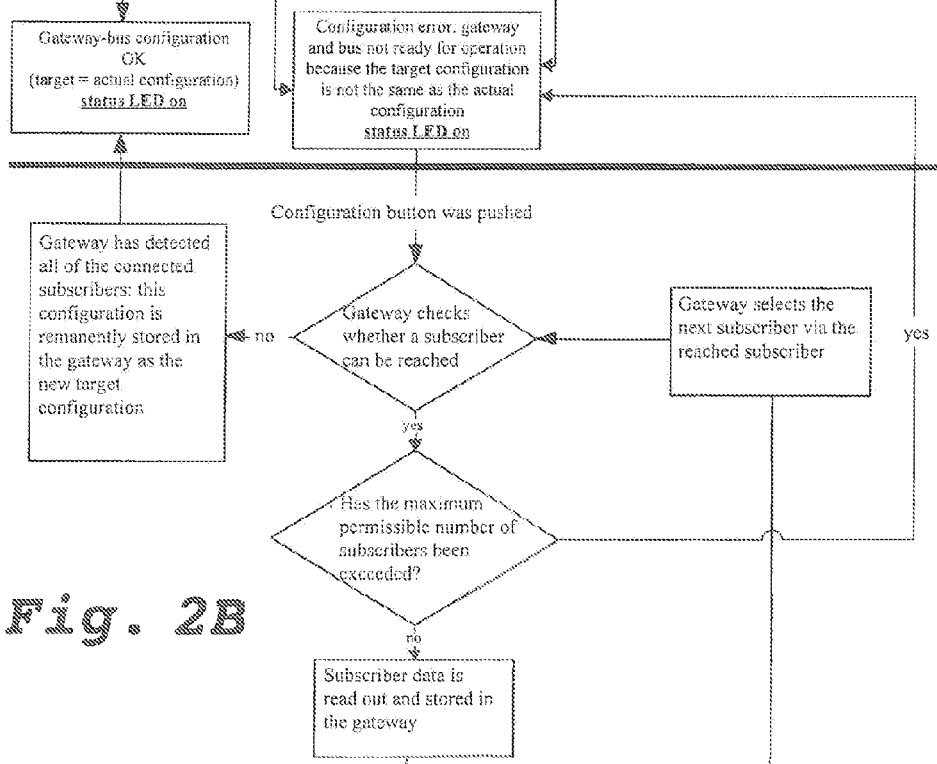

FIG. 2A shows a flowchart depicting a system test and FIG. 2B shows a flowchart for taking over a new target configuration. The flowcharts of the two figures make a transition to each other.

In the first step in FIG. 2A, the requirement is made for the voltage on the gateway to be switched on. In the next step, the gateway checks whether a subscriber can be reached on the bus. If this question is answered with "yes", it is subsequently queried whether the subscriber is expected at the gateway. If this question can likewise be answered with "yes", the subscriber is configured by the gateway in a subsequent step. Then the gateway selects the next subscriber via the configured subscriber. Subsequently, the gateway once again checks whether a subscriber can be reached on the bus and the query loop is thus closed. If this question is answered with "no" already at the beginning or at this point in time, the next question is asked as to whether a subscriber is expected by the gateway. If this question is likewise answered with "no", then the situation is such that no subscriber is present, which is prescribed as the target configuration. Therefore, it is ascertained that the configuration of the gateway bus is correct and the system is ready for operation, since the target configuration is the same as the actual configuration. This is why this state is indicated by an LED display ("status LED on").

If the question as to whether a subscriber is expected by the gateway when no subscriber can be reached on the bus is answered with "yes", or if the question as to whether the subscriber is expected by the gateway when it has been ascertained that the subscriber can be reached on the bus is answered with "no", a configuration error is present, that is to say, the gateway and bus are not ready for operation since the target configuration is not the same as the actual configuration. This is why this state is likewise indicated by an LED display ("status LED on"). The question as to whether a subscriber can be reached on the bus and whether it is expected by the gateway, is run continuously as a loop until all of the subscribers expected by the gateway and written in the configuration have been detected.

Therefore, this results in two possibilities: the actual configuration is the same as the target configuration and the actual configuration is not the same as the target configuration. In the first case, the system is ready for operation and the status is shown with the continuous lit status LED 28". In the case where they are not the same, the status LED 28" blinks, as a result of which the operator is prompted to actuate the configuration button 27. Once the configuration button 27 has been actuated, the present configuration is taken over as the target configuration and the system goes on to the final checking (FIG. 2B).

In this process, each individual subscriber is queried by the gateway and the parameters that might be present in the gateway are stored. A check is also carried out as to whether the maximum permissible number of subscribers on the application bus has not been exceeded. Should this be the case, the gateway once again goes into error status since the target configuration is not the same as the actual configuration. If this is not the case, the subscriber data is read out and stored in the gateway. Via the subscribers that have been reached, the gateway selects the next subscriber and checks for this one as well whether it can be reached. Once all of the subscribers have been detected, the gateway and the subscribers go into the normal operating state in which the control data or status data is exchanged between the gateway and the subscribers. This configuration is stored in a non-volatile manner in the gateway as the new target configuration.

FIGS. 3A and 3B show block diagrams of the bus control. FIG. 3A depicts the gateway and a first bus subscriber N1, while FIG. 3B depicts a power module 50 inserted between a second and a third bus subscriber N2, N3 as well as the bus subscriber N2. The inputs for the open field bus 2 (plug-in connector or socket 23) and the power supply unit (primary voltage 14 or U1, GND, auxiliary voltage 16 or U2) are drawn on the feed side. U1 designates the power supply unit 14 for the electronics in the gateway as well as the bus subscriber, while U2 designates the auxiliary voltage 16 for the subscriber application. The output (socket 22) of the gateway leads to the 6-wire flat ribbon cable 8.

The power module (PM) 50 can optionally be interconnected in the linear series of subscribers (FIG. 3B). This is also schematically shown again in FIG. 5. The interconnection of a power module interrupts the "linear" power supply from one subscriber to the next. The data connection and the primary voltage 14 between the bus subscribers N1, N2, N3 located upstream from the power module and the bus subscriber Nn located downstream from the power module is looped through.

With the power module PM 50 installed in the bus multiconductor, a new feed is implemented for the subsequent bus subscribers (group G) in the bus series; for this purpose, the power module is connected to a power supply unit 16', for instance, 24 volt DC. The drawing in FIG. 3B shows the power supply unit 16' coming from below (relative to the drawing page) and, in FIG. 5, coming from above (relative to the drawing page). This power supply unit can be, for instance, a contactor supply for a group of bus subscribers that are supposed to function as their own emergency-OFF group. The power module has screwed terminals or sockets 54, 55 for the power feed 16'. For the rest, the power module—like the other bus subscribers—has two sockets 51, 52, one of which being the input and the other being the output for the connection plug system. By the same token, the power module is provided with a status display 58, especially for visual display via an LED showing whether the feed voltage 16' is being applied to the group G of the bus subscribers that are downstream from the power module.

With the presented system, it is no longer necessary to create conventional control wiring for networked industrial switching devices. Particularly in the case of combinations of motor circuit breakers and contactors, the networking is done with a single pluggable connection line. The connection line 8 transfers control data or status data on the one hand, and the requisite power for the switching devices on the other hand. Moreover, the use of the above-mentioned power modules makes it possible to form groups of bus subscribers, as a result of which a separate power supply and power monitoring of such a group can be achieved. The group formation can be utilized, for example, to set up a certain segment or a certain circuit in which the switching devices form a separate emergency-OFF group, in that these can be monitored and connected or disconnected. As mentioned, the power modules can be optionally employed.

Figure 4A:
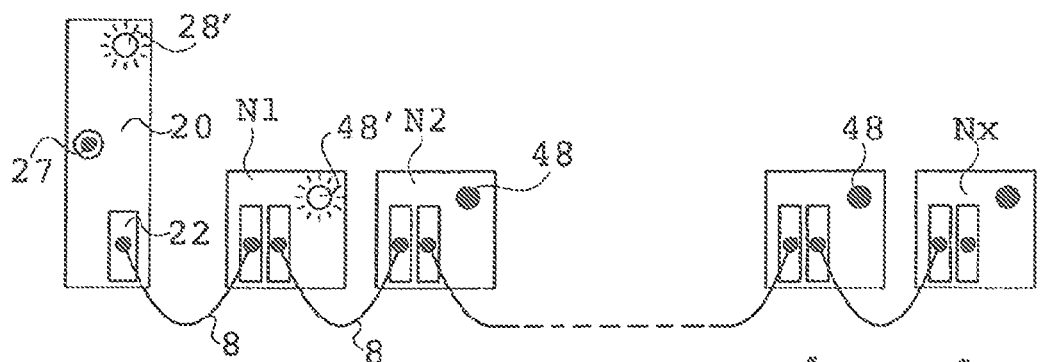
FIG. 4A to 4C respectively illustrate three configurations of bus subscribers.
Figure 4B:
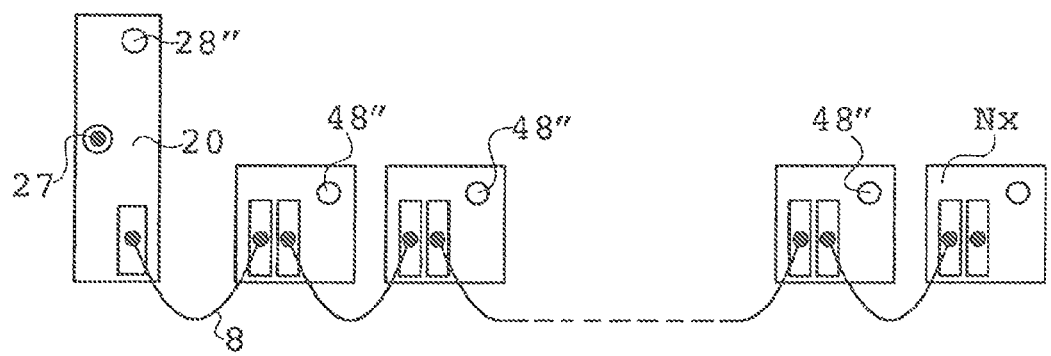
Figure 4C:
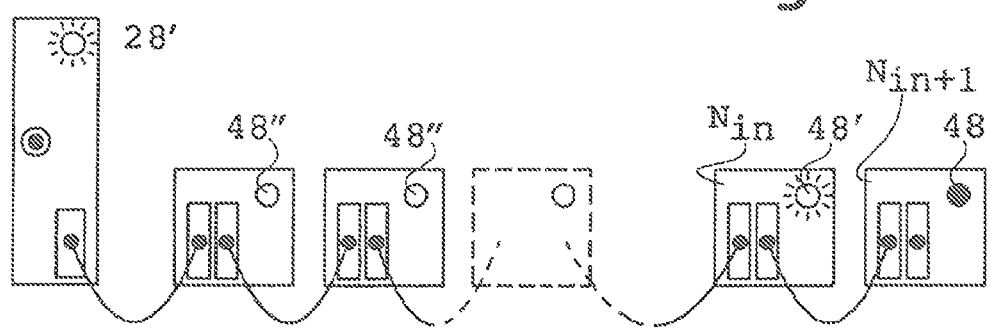

The function and mode of operation of the system are depicted on the basis of FIGS. 4A to 4C. In the drawing, a white circle with the designation 28" and 48" is a lit LED, while a black circle without any further designation is an unlit LED 28, 48, and a circle with rays around it with the designation 28' and 48' is a blinking LED.

The gateway 20 is the central element for the connection to the system of the open field bus 2. The bus subscribers N1 to Nx are supplied with power, controlled and monitored by the gateway, which also transmits control and status data of all connected bus subscribers to the superordinated field bus 2. The gateway is firstly connected to the power supply unit 14 for its own electronics and secondly to the power supply unit 16, which supplies the bus subscribers. With this configuration of the power supply unit, the auxiliary voltage 16 for bus subscribers (for instance, voltage to the contactor coils) can be switched off independently of the bus functionality (e.g. emergency-OFF system).

By means of the plug-in connector system of the 6-wire flat ribbon 8 provided here, the bus subscribers such as, for instance, combinations of motor circuit breakers and contactors, can be connected to plug-in modules consecutively. If the primary voltage 14 is being switched on for the first time after the system has been set up, then the gateway 20 checks the connected bus subscribers N1 to Nx on the application bus system, as already explained above in conjunction with FIGS. 2A and 2B. In the initial situation, an arrangement without bus subscribers is provided as the target configuration. This situation is then updated after the individual bus subscribers have been integrated, as already described above.

In FIG. 4A, n bus subscribers are wired in an initial target configuration, that is to say, without bus subscribers. In this context, the gateway 20 at first expects no bus subscribers on the basis of the target configuration. This is why, due to the configuration error, the gateway goes into error status and this is visually displayed on the gateway 20 by a blinking LED 28' (top right in the corner of the gateway 20 shown in FIG. 4A). The control LED on the first bus subscriber N1, which is directly connected to the gateway via the connection line 8, is likewise blinking (LED 48') since this was not expected by the gateway. All of the other status or control LEDs 48 of the other bus subscribers N2 to Nx are not lit, in other words, they are switched off.

According to FIG. 4B, the configuration button 27 is pushed in order to take over the connected bus subscribers at the gateway 20 as the target configuration. Then, by means of the application bus 10, the gateway consecutively checks how many bus subscribers (N1 to Nx) are connected to the application bus 10. In this process, the bus subscribers are numbered consecutively. Each individual bus subscriber stores the specific identification number in a non-volatile manner, that is to say, the specific identification number is once again available when the system is switched on again after having been switched off and this number is not lost as a result of the system having been switched off. All identification numbers are likewise stored in a non-volatile manner in the gateway. After this procedure, all of the connected bus subscribers are configured. The LED 28" on the gateway and the LEDs 48" on the bus subscribers are all statically switched on and lit.

FIG. 4B also depicts the situation in which, upstream from the gateway, the system is electrically switched off and once again switched on in terms of the primary voltage 14. After the system is switched on, the gateway checks all of the connected bus subscribers consecutively and compares them one step at a time with the internally stored target configuration. In the described situation, the target situation matches the connected subscriber configuration (actual situation), since it is unchanged. Thus the system remains ready for operation.

The individual bus subscribers can now be actuated and monitored by means of the bus controller of the superordinated open field bus 2. If the structure of the connected devices changes, for example, if devices are expanded or removed, this is detected by the gateway on the basis of the diverging target-actual configuration and indicated by the status LED 28.

FIG. 4C shows an example of an existing configuration of a gateway 20 and n bus subscribers N1 to Nx that is ready for operation after having been configured. If this structure is augmented by one or more bus subscribers (Nin), this results in the following scenario after the system is switched on: the gateway status LED 28' is blinking because the previous target configuration (n bus subscribers) deviates from the actual configuration (n+1 bus subscribers). Moreover, the LED 48' of the first added (also in case of several added) bus subscribers Nin is also blinking because this or these bus subscriber(s) was/were not expected by the gateway. In this manner, the user can very easily recognize on the basis of the blinking LEDs where the deviation of the actual configuration is present. By simply pushing the configuration button 27, the new configuration is automatically taken over by the gateway. After the automatic bus configuration has run, one would have now the same situation for n+x bus subscribers as was shown in FIG. 4B for n subscribers.

FIG. 5 shows the use of at least one power module 50 to form a group G of bus subscribers. The bus subscribers—here the plug-in module on the combination of motor circuit breakers and contactors—located downstream from the power module are cut off from the auxiliary power supply unit 16 for the subscriber application, this is done by the power module, and auxiliary voltage 16' is newly fed to the subscriber application. The application bus 10 is looped through data-technically and in terms of the primary power supply unit 14 for the electronics of the bus subscriber at a ratio of 1:1 in the power module. When the auxiliary voltage 16' fed into the power module is switched off, the bus subscribers, for instance, contactors, are current-free downstream from the power module. The electronics of the bus subscribers, however, continue to be supplied with power and therefore continue to transmit to the gateway the current actuator status, for instance, contact status of the motor starter.

The use of the power modules has an advantageous effect in that independent groups of combinations of motor circuit breakers and contactors can be formed, e.g. an emergency-OFF switching circuit that can be separately switched off. The use of power modules can take place at any desired place in the connection plug system. Several power modules can also be built into the connection plug system, so that several independent groups of bus subscribers are formed.

The above-mentioned features of the system and its components can be provided individually or in combination with each other. Aside from the described embodiment variants, numerous others are also possible in which a single connection line is provided within the system in order to connect bus subscribers to the gateway and in order to transmit control and/or status data and power.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 2 open field bus
8 connection line (for example, 6-wire flat ribbon line)
10 application bus (LIN bus)
N1 to Nn-x bus subscribers (actuator, motor starter, power switch
14, 14' primary voltage (24 volt DC)
16, 16' auxiliary voltage (24 volt DC)
20 gateway
22 socket of the gateway
23 sockets for the open field bus
24 primary voltage feed (screw-in terminals)
25 auxiliary voltage feed (screw-in terminals)
27 configuration button
28 status LED
40 SM plug-in module
41, 42 socket for connection plug on flat ribbon cable
44, 45 socket for power supply unit
46 mechanical display
48 control LED
49 pins for arrangement on contactor in a motor starter
50 power module PM
51, 52 sockets for connection plugs on flat ribbon cable
54, 55 socket for power supply unit
58 control LED
L1, L2, L3 mains connection for bus subscribers (actuator)
M load (motor) on main voltage

What is claimed is:

1. A system for controlling bus-networked devices, the system comprising:
a gateway including at least one memory unit and having an interface to an open field bus;
a first power supply unit electrically connected to the gateway and configured to supply primary power for the gateway and a plurality of bus subscribers;
an auxiliary power supply unit configured to supply auxiliary power for the plurality of bus subscribers independent of bus functionality;

a pluggable connection cable configured to electrically connect the gateway to the plurality of bus subscribers and to transmit the primary and the auxiliary power and at least one of control information and status information between the gateway and the plurality of bus subscribers;

an application bus configured to network the plurality of bus subscribers to each other, the application bus being operable by the connection cable; and a bus controller configured to write a target bus configuration of the application bus and to store the target bus configuration in a non-volatile manner in the at least one memory unit, the bus controller being further configured to overwrite the target bus configuration with a present, actual bus configuration of the application bus as a new target configuration.

2. The system according to claim 1, wherein the gateway includes at least one actuation element configured to initiate a configuration mode in the gateway in which the present, actual bus configuration is taken over by the gateway as the new target configuration, the new target configuration having at least one additional bus subscriber relative to the target configuration.

3. The system according to claim 2, wherein, in the configuration mode, the gateway is configured to check how many bus subscribers are connected to the application bus.

4. The system according to claim 1, wherein at least one of the plurality of bus subscribers includes at least one report device configured to report at least one of an actuator action and an actuator position on the application bus.

5. The system according to claim 1, wherein the application bus is a Local Interconnect Network (LIN) bus, and wherein the transmission of the control information and the status information, and the configuration of the application bus is handled via a protocol that includes LIN data frames, the LIN data frames having a length of at least one byte and not more than 8 bytes.

6. The system according to claim 1, wherein the plurality of bus subscribers are industrial switching devices.

7. The system according to claim 6, wherein the industrial switching devices include at least one of power switches, motor circuit breakers and contactors, electronic motor-protection relays and frequency converters.

8. The system according to claim 1, wherein the plurality of bus subscribers are connected to each other on the application bus in a linear manner via the connection cable.

9. The system according to claim 1, wherein the connection cable is a 6-wire flat ribbon cable.

10. The system according to claim 1, wherein the connection cable includes lines for transmitting the primary and auxiliary power, at least one control line and at least one status line.

11. The system according to claim 10, wherein the at least one control line includes a line configured to switch a contactor of the plurality of bus subscribers on and off, and wherein the at least one status line includes a line configured to query a switching position of the contactor or a status of a motor circuit breaker of the plurality of bus subscribers.

* * * * *